US006547217B1

(12) United States Patent
Dygert

(10) Patent No.: US 6,547,217 B1
(45) Date of Patent: Apr. 15, 2003

(54) VARIABLE REACH LIFT ARM

(75) Inventor: Olen Dean Dygert, Battle Creek, MI (US)

(73) Assignee: PCC Superior Fabrication, Kincheloe, MI (US)

( * ) Notice: Subject to any disclaimer, the term of this patent is extended or adjusted under 35 U.S.C. 154(b) by 0 days.

(21) Appl. No.: 09/951,576

(22) Filed: Sep. 12, 2001

Related U.S. Application Data

(60) Provisional application No. 60/232,487, filed on Sep. 13, 2000.

(51) Int. Cl.[7] .................................................. B60P 1/48
(52) U.S. Cl. ........................ 254/8 R; 254/2 R; 254/124
(58) Field of Search ................................ 254/8 R, 129, 254/2 R; 182/2; 74/89.12, 527

(56) References Cited

U.S. PATENT DOCUMENTS

| | | | | |
|---|---|---|---|---|
| 2,815,138 A | * 12/1957 | Noffsinger | 414/709 |
| 3,140,788 A | * 7/1964 | Clar | 414/709 |
| 3,542,222 A | * 11/1970 | Reilly | 414/709 |
| 3,591,025 A | * 7/1971 | Perrott | 214/147 |
| 3,915,429 A | * 10/1975 | Zelli | 254/8 R |
| 4,355,946 A | 10/1982 | Wykhuis | |
| 4,360,187 A | * 11/1982 | Chapman | 254/8 R |
| 4,645,408 A | * 2/1987 | Mizuno | 414/733 |
| 4,674,944 A | 6/1987 | Addleman | |
| 5,037,068 A | * 8/1991 | Grottesi | 254/8 B |
| 5,046,914 A | 9/1991 | Holland et al. | |
| 5,405,237 A | 4/1995 | Oka | |
| 5,415,516 A | * 5/1995 | Richards | 414/458 |
| 5,885,050 A | 3/1999 | Kim | |
| 6,053,476 A | * 4/2000 | Chapman | 254/8 R |

* cited by examiner

*Primary Examiner*—Joseph J. Hail, III
*Assistant Examiner*—Daniel Shanley
(74) *Attorney, Agent, or Firm*—Reising, Ethington, Barnes, Kisselle, Learman & McCulloch, PC

(57) ABSTRACT

A variable reach device for attachment to a boom of a lift truck to increase the range of movement of a fork carriage of the lift truck. In one embodiment, the device has a mast connected at one end to the boom and an arm pivotally connected at one end to the other end of the mast. The fork carriage is pivotally connected to the other end of the arm and its attitude or orientation is controlled during movement of the arm. In another embodiment, the reach device provides a purely horizontal movement of the fork carriage to extend the fork carriage away from the boom as the device unfolds and to retract the fork carriage back towards the boom as the device is folded. In this embodiment, the fork carriage is slidably carried by the arm via a lift chain connected to a cam which rotates in proportion to the rotational movement of the arm relative to the mast. The cam is designed to let out or take up the lift chain in proportion to the vertical component of the movement of the free end of the arm as it pivots about the mast to maintain the constant vertical height of the fork carriage as it is laterally advanced and retracted.

33 Claims, 5 Drawing Sheets

VARIABLE REACH LIFT ARM

REFERENCE TO CO-PENDING APPLICATION

This application claims the benefit of U.S. Provisional Patent Application Ser. No. 60/232,487, filed Sep. 13, 2000.

FIELD OF THE INVENTION

This invention relates generally to a lifting device such as a forklift, and more particularly to an attachment for a lifting device having a variable reach.

BACKGROUND OF THE INVENTION

A typical so-called variable reach forklift has a boom pivotally attached to the vehicle at one end and a fork carriage with a pair of lifting tines fixed to the other end of the boom. The boom may be rotated about its pivot to change the vertical height of the fork carriage and lifting tines, as desired. Additionally, the boom preferably comprises at least a pair of telescoped segments to permit lateral extension and retraction of the fork carriage and lifting tines. The extension and retraction of the carriage occurs only in-line with the telescoped segments of the boom. Accordingly, when the boom is rotated about its pivot to raise the carriage, the carriage is only extendable along this inclined angle corresponding to the inclination of the boom.

In many instances, it is desirable to not only raise the carriage to a desired height, but to thereafter advance the carriage substantially horizontally to a reference such as the ground or the horizon. By way of example, it may be desirable to raise the fork carriage by pivoting and inclining the boom and thereafter advancing the fork carriage through, for example, an opening and scaffolding or through an open window of a building, to place an object or objects on the lifting tines on the scaffolding or in the building. It is desirable to provide this movement without having to move the entire vehicle.

Still further, there is a need for an apparatus which increases the range of movement of the fork carriage beyond that attainable by the boom and permits movement of the fork carriage along a path not coincident or parallel to the axis of the boom. Further, throughout the movement of the fork carriage, it is desirable that the lifting tines maintain a desired orientation to facilitate balancing and carrying objects on the lifting tines. Prior lift trucks have utilized a separate hydraulic cylinder operably connected to the fork carriage and either automatically or manually operated to maintain the desired orientation of the lifting tines.

SUMMARY OF THE INVENTION

A variable reach device for attachment to a boom of a lift truck to increase the rang e of movement of a fork carriage o f the lift truck. In one embodiment, the device has a mast connected at one end to the boom and an arm pivotally connected at one end to the other end of the mast with the fork carriage pivotally connected to the other end of the arm. The arm pivots about the mast in one direction to fold or retract the device and dispose the fork carriage in its retracted position. The arm pivots about the mast in a second direction to unfold or extend the device and move the fork carriage away from the boom along an arcuate path having both vertical and horizontal components. In another embodiment, the reach device provides a purely horizontal movement of the fork carriage to extend the fork carriage away from the boom as the device unfolds and to retract the fork carriage back towards the boom as the device is folded. In this embodiment, the fork carriage is slidably carried by the arm via a lift chain connected to a cam which rotates in proportion to the rotational movement of the arm relative to the mast. The cam is designed to let out or take up the lift chain in proportion to the vertical component of the movement of the free end of the arm as it pivots about the mast to maintain the constant vertical height of the fork carriage as it is laterally advanced and retracted.

Desirably, in both embodiments of the reach device, the inclination or attitude of the lifting tines of the fork carriage is maintained throughout the range of movement of the fork carriage. This is accomplished by operably connecting the fork carriage to a sprocket driven through a chain by a drive sprocket which rotates in response to and in proportion to the pivotal or rotational movement of the arm about the mast.

Objects, features and advantages of this invention include providing a reach device for a fork lift which increases the range of movement of a fork carriage, maintains lifting tines of the fork carriage in a desired orientation throughout the range of movement of the fork carriage, can provide a purely horizontal advancement of the fork carriage relative to the boom, can provide both an increased vertical and an increased horizontal reach relative to the boom, utilizes a single hydraulic cylinder to both the advance the fork carriage and to maintain its lifting tines level, increases the utility of the fork lift, permits increased advancement of the fork carriage without moving the forklift vehicle, is of relatively simple design and economical manufacture and assembly, is reliable, durable and has a long, useful life in service.

BRIEF DESCRIPTION OF THE DRAWINGS

These and other objects, features and advantages of this invention will be apparent from the following detailed description of the preferred embodiments and best mode, appended claims and accompanying drawings in which:

DETAILED DESCRIPTION OF THE PREFERRED EMBODIMENTS

Figure 1A:
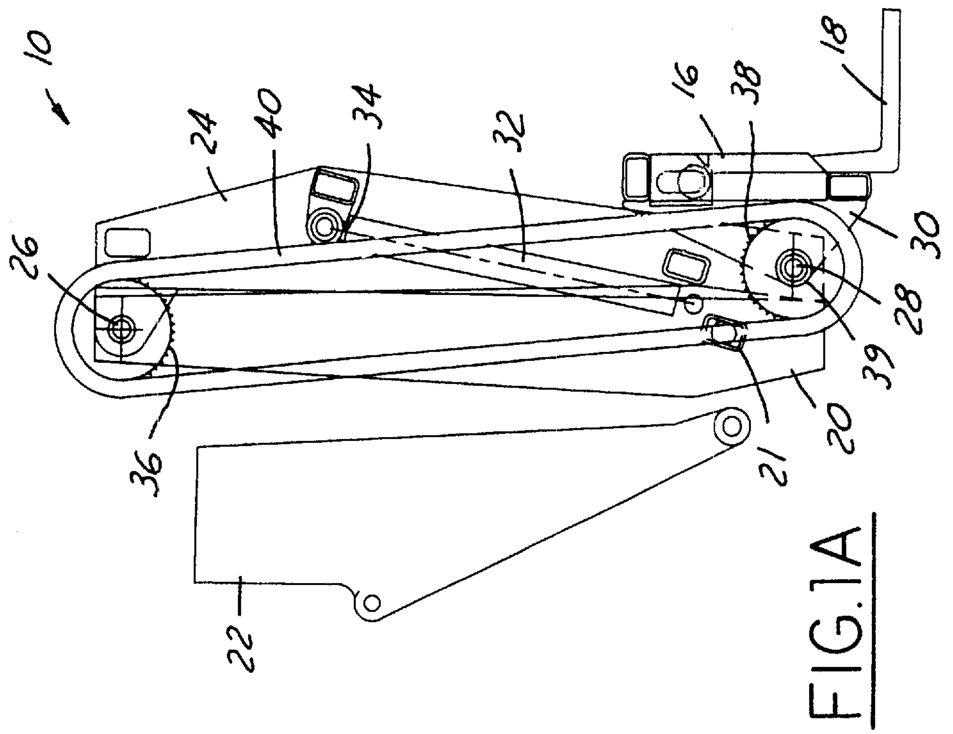
FIG. 1A is an enlarged view of the variable reach device as shown in FIG. 1.
Figure 1:
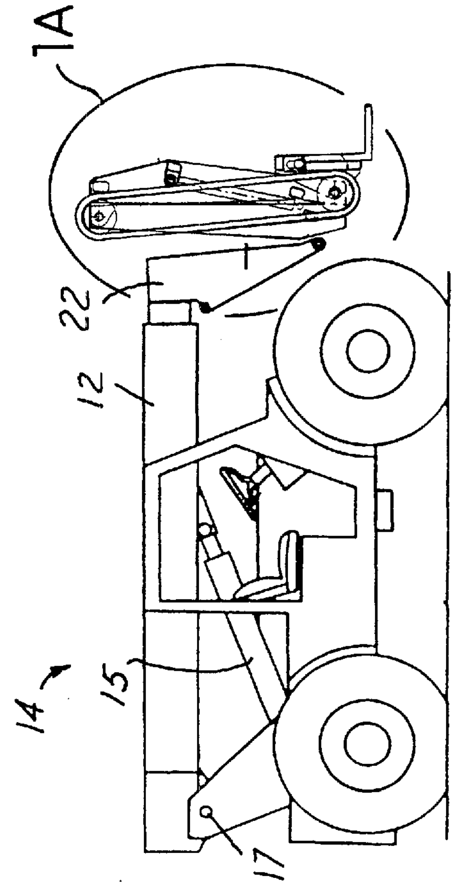
FIG. 1 is a diagrammatic side view of a lift truck and a variable reach device according to a first embodiment of the invention shown in its retracted position.
Figures 2, 3:
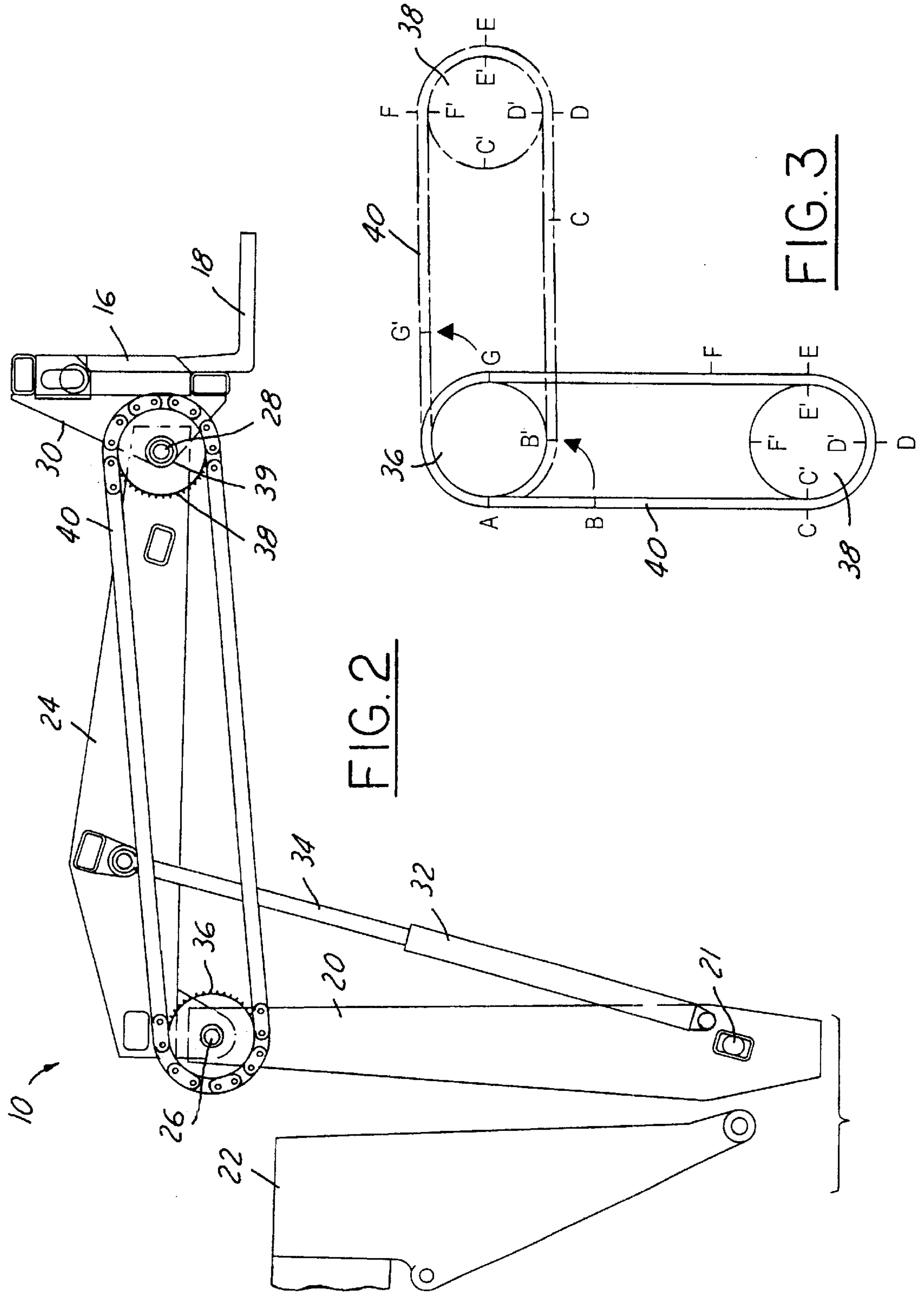
FIG. 2 is a diagrammatic side view of the device of FIG. 1 shown in its extended position.
FIG. 3 is a diagrammatic view of sprockets of the variable reach device and a chain interconnecting them.

Referring in more detail to the drawings, FIGS. 1 and 2 illustrate an arm reach device 10 according to a first embodiment of the invention which is constructed to be connected to a boom 12 of a forklift truck 14 to provide an extended range of motion of a fork carriage 16 and its lifting tines 18. Desirably, this extended motion can occur without movement of the boom 12 or the vehicle 14 itself. The boom 12 is driven by an actuator such as a hydraulic cylinder 15 for rotation about a pivot 17 of the lift truck 14. The device 10 has a mast 20 pivotally connected on shaft 21 to a gooseneck 22 itself connected to the boom 12 of the lift truck 14. An arm 24 is pivotally connected at one end to the mast 20 by a first pivot shaft 26 and has the fork carriage 16 pivotally connected to its free end by a second pivot shaft 28. The first pivot shaft 26 is carried by the mast 20 and the second pivot shaft 28 is carried by the arm 24. A hydraulic cylinder 32 is fixed at one end to the mast 20 and has a rod .34 attached to the arm 24 and driven between extended and retracted positions to drive the arm 24 between its retracted position, as shown in FIG. 1 and its extended position as shown in FIG. 2 where it is pivoted relative to the mast 20 about the first pivot shaft 26.

To interconnect the first pivot shaft 26 and second pivot shaft 28, a first drive member, which may be a first sprocket 36, is fixed to the mast 20 and a first driven member, which may be a second sprocket 38, is rotatably carried by the second pivot shaft 28 and fixed to the fork carriage 16 via tubular shaft 39 disposed over the second pivot shaft 28 for rotation of the fork carriage with the second sprocket 38. A connecting member, such as a chain 40, is trained around both sprockets 36, 38 which desirably have the same pitch diameter. Accordingly, a given pivotal movement of the arm 24 relative to the mast 20, causes the chain to correspondingly wrap and unwrap from the first sprocket 36, as best shown in FIG. 3. When the arm 24 moves from its retracted to its extended position shown by the dashed lines in FIG. 3, point A on chain 40 remains in the same position on sprocket 36. A portion of chain 40 wraps onto sprocket 36 until point B on the chain 40 engages point B' on sprocket 36. Similarly, a portion of chain 40 unwraps from sprocket 36 causing point G on chain 40 to move off sprocket 36 to location G' as shown. This movement of chain 40 relative to sprocket 36 causes a corresponding clockwise rotation of the second sprocket 38 and the fork carriage 16 fixed thereto. As shown in FIG. 3, the clockwise rotation of second sprocket 38 moves point C on chain 40 away from C' on sprocket 38 and moves point F on chain 40 onto point F' on sprocket 38. Points D and E on chain 40 remain adjacent to points D' and E', respectively, on sprocket 38 during this rotation of the sprocket. In this manner, counterclockwise rotation of the arm 24 causes a proportional clockwise rotation of the fork carriage 16 to maintain the inclination or attitude of its lifting tines 18 constant throughout the movement of the arm 24 between its retracted and extended positions. Likewise, as the arm 24 is moved clockwise from its extended position to its retracted position, the chain 40 moves in the reverse direction to cause a corresponding counter-clockwise rotation of the second sprocket 38, and fork carriage 16 to maintain the inclination or attitude of the lifting, tines 18 of the fork carriage 16 the same throughout the arcuate travel of the fork carriage 16 back toward its retracted position. Notably, the fork carriage moves along, an arcuate path dictated by the pivotal movement of the arm 24 and having both horizontal and vertical components.

In operation, as the arm 24 is moved from its retracted position, as shown in FIG. 1, to its extended position as shown in FIG. 2, the first sprocket 36 which is fixed to the mast 20 does not rotate and the chain 40 wraps and unwraps therefrom as described previously. Because the first and second sprockets 36, 38 have the same pitch diameter, rotation of the arm 24 causes a proportional rotation of the second sprocket 38 in response to the movement of chain 40 relative to the first sprocket 36 to cause a correspondingly proportional rotation of the fork carriage 16. In this manner, the inclination or attitude of the lifting tines 18 of the fork carriage 16 is maintained the same throughout the arcuate travel of the fork carriage 16 between the retracted and extended positions of the arm 24.

Accordingly, the first embodiment of the invention provides a reach device 10 which enables further horizontal and vertical travel of the fork carriage 16 beyond that possible with the boom 12 itself Throughout this extended reach having both horizontal and vertical components, the inclination or attitude of the lifting tines 18 of the fork carriage 16 is maintained to enable steady balanced lifting of an object or objects on the lifting tines 18.

For increased stability, the device 10 may have a pair of arms 24 connected together in spaced apart relation. The device preferably also has a pair of parallel first sprockets 36, second sprockets 38 and chains 40 to better balance the device 10 and distribute the loads thereon. The operation of the device 10 remains as described above.

Second Embodiment

Figures 4, 5, 6:
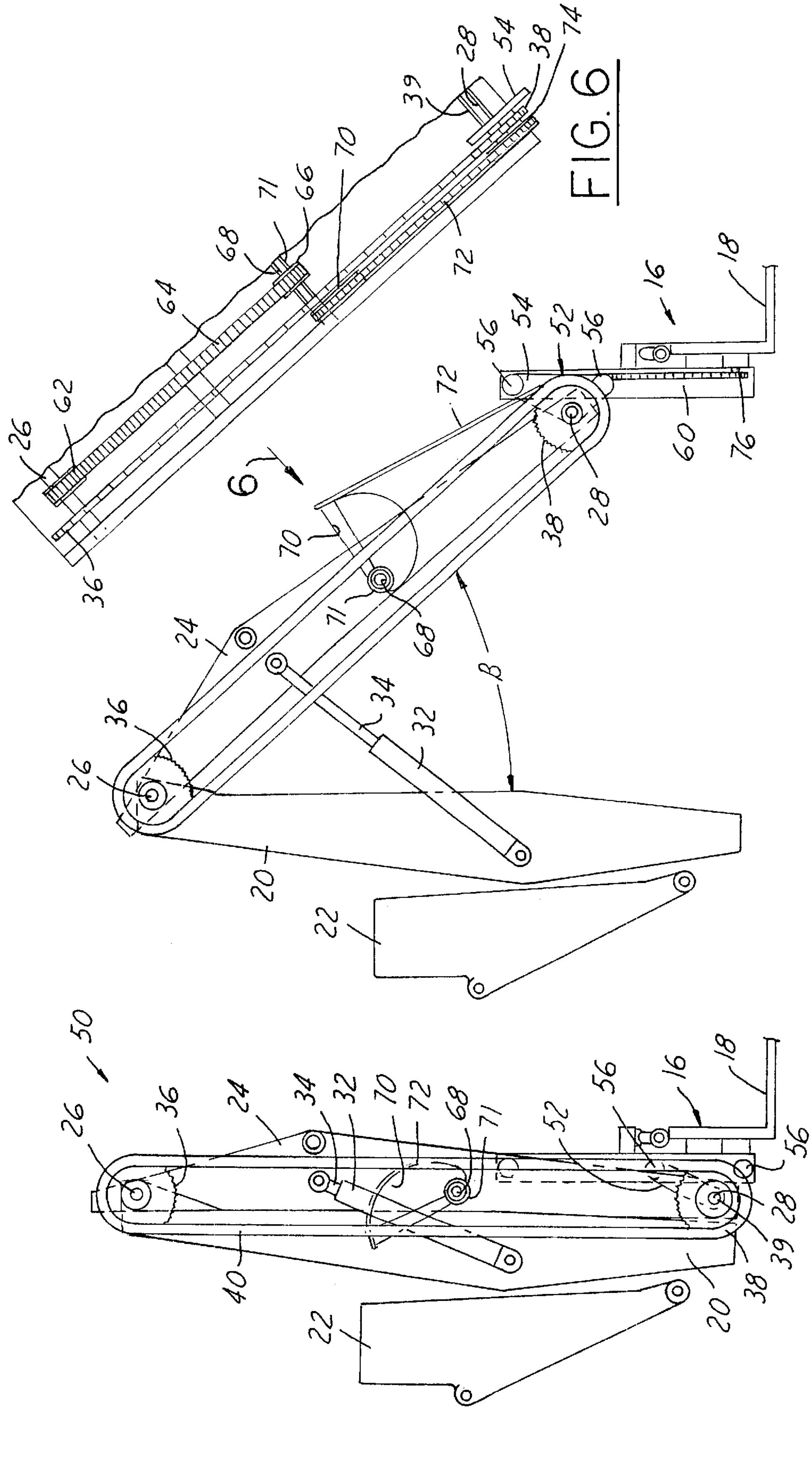
FIG. 4 is a diagrammatic side view of a variable reach device according to a second embodiment of the invention and shown in its retracted position.
FIG. 5 is a side view of the device of FIG. 4 shown in its extended position.
FIG. 6 is a plan view of the arm and associated components of the device of FIGS. 4 and 5.
Figure 8:
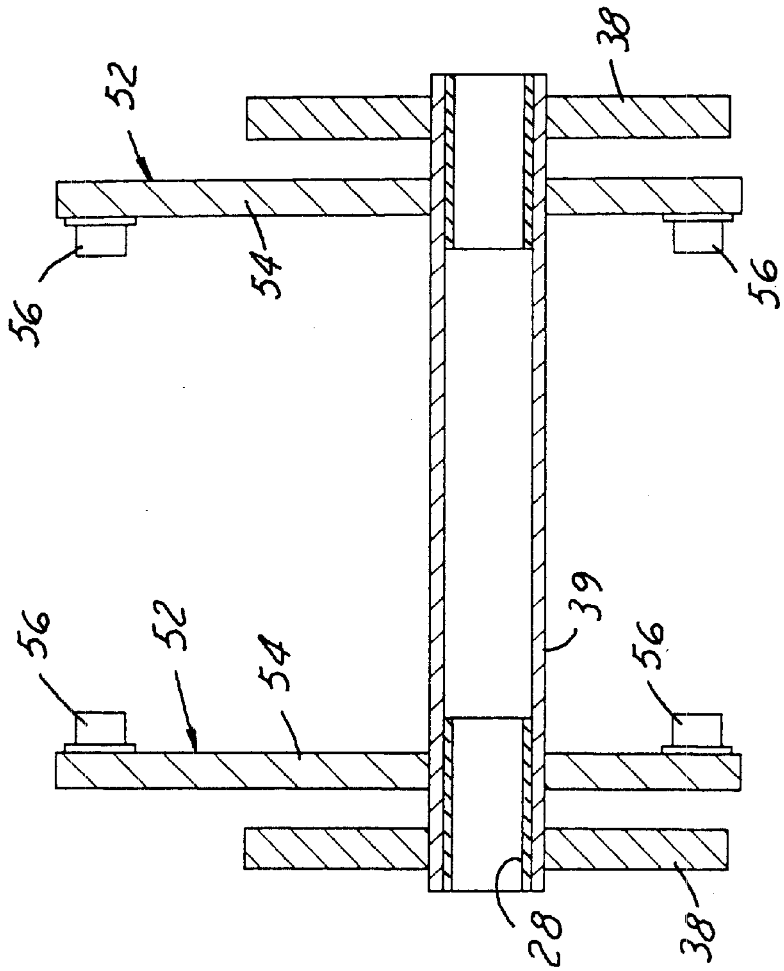
FIG. 8 is an end view of the roller bracket assembly.
Figure 7:
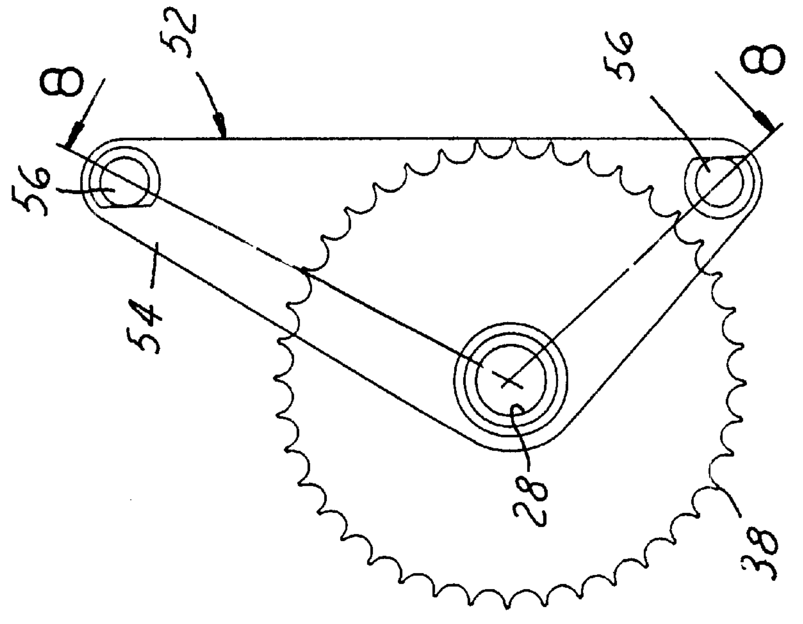
FIG. 7 is a side view of a roller bracket assembly.

An arm reach device 50 according to a second embodiment of the invention as best shown in FIGS. 4 and 5 has the same components as the first embodiment reach device 10 to maintain the inclination of the forks or tines 18 constant over the entire range of motion of the fork carriage 16. Each of the components previously described with reference to the first embodiment will be given the same reference number and will not be described further with regard to the second embodiment.

As best shown in FIGS. 4–8 and 11 the fork carriage 16 is operably connected to the second sprocket 38 by a roller bracket assembly 52 and is not fixed to the second sprocket 38 as in the first embodiment device 10. The roller bracket assembly 52 comprises a pair of triangular plates 54 fixed to the second sprocket 38 and rotatably carried on the second pivot shaft 28 via shaft 39 for co-rotation therewith and having a pair of spaced apart roller posts 56 slidably received in tracks or channels 58 defined by an I-beam support 60 of the fork carriage 16. Desirably, the rollers 56 permit the roller bracket 52 to movably carry and slide relative to the fork carriage 16 to permit the fork carriage 16 to be maintained at the same height throughout the movement of the arm 24. The tilting or inclination of the fork carriage 16 is still controlled by the engagement of the roller bracket 52 therewith in response to rotation of the second sprocket 38 in much the same manner as described for the first embodiment reach device 10.

Figure 9:
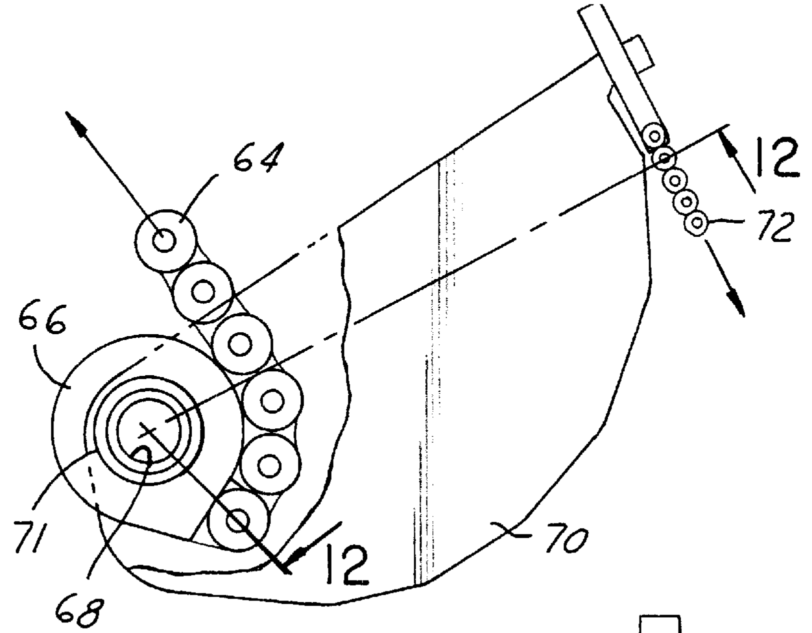
FIG. 9 is a side view of a driven sprocket and cam.
Figure 10:
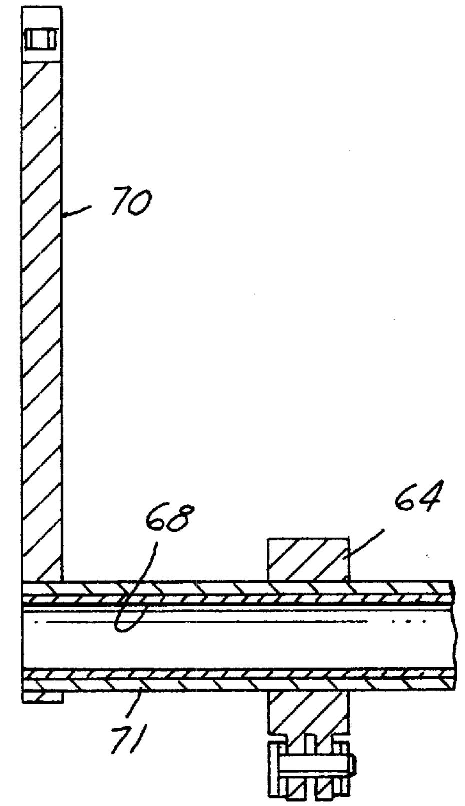
FIG. 10 is an end view of the driven sprocket and cam.
Figure 11:
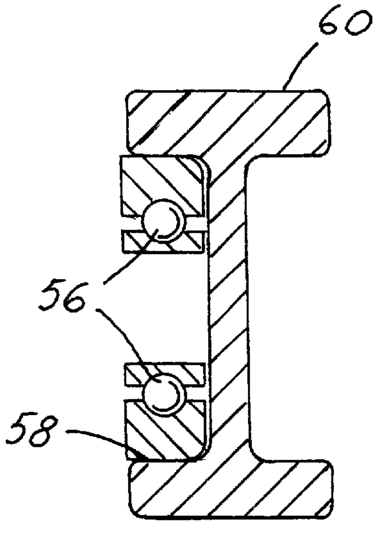
FIG. 11 is a plan view of an I-beam of the fork carriage illustrating the position of rollers on the roller bracket in relation to the fork carriage.

In addition to the modified roller bracket assembly 52, the second embodiment reach device 50 has additional components to perform the function of maintaining the height of the fork carriage 16 and hence its lifting tines 18 constant throughout the stroke or range of arcuate or pivoted movement of the arm 24. The reach device 50 has a second drive member, which may be a drive sprocket 62 rotatably carried by the first pivot shaft 26, fixed to mast 20 and interconnected by a second connecting member, such as chain 64 to a second driven member, which may be driven sprocket 66 that is rotatably carried by a third pivot shaft 68 carried by the arm 24. As shown in FIGS. 9 and 10, a cam 70 is also rotatably carried by the third pivot shaft 68 and is fixed for co-rotation to the driven sprocket 66 via a tubular shaft 71 received over the third pivot shaft 68 as best shown in FIG. 10. The cam 70 is connected to the fork carriage 16 by a third connecting member, such as lift chain 72, connected at one end to the cam 70 and at its other end to the fork carriage 16. An idler wheel 74 is preferably disposed between the cam 70 and fork carriage 16 and is rotatably carried on the second pivot shaft 28. The idler wheel 74 is preferably positioned to receive a portion of the lift chain 72 to ensure that the lift chain 72 acts on the fork carriage 16 in a linear or purely vertical fashion. Thus, the idler wheel 74 has an outer portion vertically aligned with a lug or pin 76 to which the chain 72 is fastened on the fork carriage 16.

To maintain the height of the fork carriage 16 and its lifting tines 18 constant throughout the movement of the arm 24, the lift chain 72 needs to be drawn up and let out as a function of the sine of the angle β at which the arm 24 is inclined relative to the mast 20. Accordingly, the cam 70 has a contour proportional to the sine of the angle spanned by the arm 24. In this way, rotation of the cam 70 in a clockwise direction lets out the lift chain 72 in proportion to the increase in the vertical height of the free end of the arm 24 as it moves to its extended position shown in FIG. 5. Rotation of the cam 70 in a counterclockwise direction takes up the lift chain 72 in proportion to the decrease in vertical height of the arm 24 as it moves towards the mast 20 to its retracted position shown in FIG. 4.

In operation, to move the arm 24 from its retracted position as shown in FIG. 4 to its extended position as shown in FIG. 5, the rod 34 of the hydraulic cylinder 32 is advanced to rotate the arm 24 counterclockwise relative to the mast 20. This causes a corresponding clockwise rotation of the second sprocket 38 and roller bracket assembly 52 to maintain the attitude or inclination of the fork carriage 16 as described with reference to the first embodiment device 10. Rotation of the arm 24 from its retracted position to its extended position also causes chain 64 to wrap and unwrap from drive sprocket 62 in the same manner that chain 40 behaves with respect to the first sprocket 36. This causes a clockwise rotation of the driven sprocket 66 and the cam 70 fixed to the driven sprocket 66. Clockwise rotation of the cam 70 lets out lift chain 72 in proportion to the vertical displacement of the arm 24 to maintain the level or vertical height of the lifting tines 18 constant throughout the arcuate movement of the arm.

Likewise, as the actuating rod 34 is retracted to move the arm 24 back to its retracted position, the arm 24 rotates clockwise about the mast 20 and portions of the chain 64 wrap and unwrap from drive sprocket 62 to cause a corresponding counterclockwise rotation of the driven sprocket 66 and cam 70. The counterclockwise rotation of the cam 70 causes it to increasingly engage and take up the chain 72 in proportion to the vertically downward component of the movement of the arm 24 to maintain the elevation or vertical height of the fork carriage 16 and its lifting tines 18 constant. Simultaneously of course, the fork carriage inclination assembly, which includes the first sprocket 36, second sprocket 38, chain 40 and the roller bracket assembly 52, maintain the inclination or attitude of the fork carriage 16 and its lifting tines consistent throughout the range of movement of the arm 24.

Accordingly, the reach device 50 according to the second embodiment not only maintains the attitude or inclination of the fork carriage 16 and its lifting tines 18 the same throughout the range of movement of the arm 24 between its extended and retracted position, but also maintains the vertical height or elevation of the fork carriage 16 and its lifting tines 18 consistent throughout the movement of the arm 24 to provide a purely horizontal extension or reach of the fork carriage 16. Desirably, this facilitates advancing the lifting tines 18 into an opening of a scaffolding or an opening of a building to deposit materials on the scaffolding or in the building. Desirably, only a single actuator 32 is needed to operate the reach device 10, 50 of either embodiment to facilitate operator control and increase the reliability of the devices 10, 50.

What is claimed is:

1. A lift device, comprising:

a mast;

an arm pivotally carried by the mast;

an actuator connected to the arm and operable to pivot the arm relative to the mast;

a first drive member fixed to the mast;

a fork carriage pivotally carried adjacent to one end of the arm;

a first driven member secured against rotation relative to the fork carriage; and a connecting member interconnecting the first drive member and the first driven member such that pivotal movement of the arm causes the first driven member and the fork carriage to co-rotate relative to the arm.

2. The device as in claim 1 wherein the first drive member, connecting member and first driven member are arranged so that the first driven member and fork carriage rotate in proportion to but in the opposite direction of the pivotal movement of the arm to maintain the attitude of the fork carriage substantially the same throughout the movement of the arm.

3. The lift device as in claim 2 wherein the fork carriage has at least one tine such that said at least one tine maintains the same attitude throughout the movement of the arm.

4. The lift device as in claim 2 wherein the first drive member is a first sprocket and the first driven member is a second sprocket, the first and second sprockets having the same pitch diameter, and the connecting member is a chain trained around the first and second sprockets.

5. The lift device as in claim 4 wherein counterclockwise pivotal movement of the arm causes the chain to move relative to the first sprocket which causes the second sprocket and fork carriage to rotate clockwise to ensure the fork carriage maintains the same attitude throughout the counterclockwise movement of the arm.

6. The lift device as in claim 4 wherein clockwise pivotal movement of the arm causes the chain to move relative to the first sprocket which causes the second sprocket and fork carriage to rotate counterclockwise to ensure the fork carriage maintains the same attitude throughout the clockwise movement of the arm.

7. The lift device as in claim 5 wherein when the chain moves relative to the first sprocket a portion of the chain unwraps from the first sprocket and a different portion of the chain engages and wraps onto the first sprocket.

8. The lift device as in claim 6 wherein when the chain moves relative to the first sprocket a portion of the chain unwraps from the first sprocket and a different portion of the chain engages and wraps onto the first sprocket.

9. The lift device as in claim 1 further comprising a first pivot shaft carried by the mast with the first drive member rotatably carried by the first pivot shaft.

10. The lift device as in claim 9 further comprising a second pivot shaft carried by the arm and wherein the first driven member is rotatably carried on the second pivot shaft.

11. The lift device as in claim 10 further comprising a tubular shaft disposed over the second pivot shaft wherein the first driven member and the fork carriage are fixed to the tubular shaft to permit rotation of the first driven member and fork carriage relative to the second pivot shaft.

12. The lift device as in claim 1, further comprising a bracket rotatably carried on the second pivot shaft with the fork carriage movably carried by the bracket and the first driven member fixed to the bracket.

13. The lift device as in claim 12 wherein the fork carriage has an I-beam support with channels and the bracket has laterally spaced roller posts slidably received in the channels of the I-beam support.

14. A lift device, comprising:

a mast;

an arm pivotally carried by the mast;

an actuator connected to the arm and operable to pivot the arm relative to the mast;

a first drive member fixed to the mast;

a fork carriage pivotally carried adjacent to one end of the arm;

a first driven member secured against rotation relative to the fork carriage; and a connecting member interconnecting the first drive member and the first driven member such that pivotal movement of the arm causes the first driven member and the fork carriage to co-rotate relative to the arm;

a second drive member fixed to the mast;

a second driven member pivotally carried by the arm;

a cam pivotally carried by the arm;

a second connecting member interconnecting the second drive member and the second driven member to cause the driven member and the cam to co-rotate relative to the arm; and a third connecting member interconnecting the cam and the fork carriage to cause the fork carriage to extend away from or retract towards the arm in response to movement of the cam.

15. The lift device as in claim 14 wherein the cam has a contour proportional to the sine of the angle spanned by the arm during pivotal movement of the arm.

16. The lift device as in claim 14 further comprising a first pivot shaft carried by the mast with the first drive member and the second drive member rotatably carried by the first pivot shaft.

17. The lift device as in claim 16 further comprising a second pivot shaft and an idler wheel wherein the second pivot shaft is carried by the arm and wherein the first driven member, the bracket, and the idler wheel are rotatably carried on the second pivot shaft.

18. The lift device as in claim 17 wherein the third connecting member is connected at one end to the cam and at its other end to the fork carriage with a portion of the third connecting member received by the idler wheel to ensure that the third connecting member acts on the fork carriage in a linear fashion.

19. The lift device as in claim 13 further comprising a third pivot shaft carried by the arm with the second driven member and the cam rotatably carried by the third pivot shaft.

20. The lift device as in claim 13 wherein clockwise pivotal movement of the arm causes the second connecting member to move relative to the second drive member which causes the second driven member and cam to co-rotate clockwise which in turn causes the third connecting member to move in proportion to the vertical displacement of the arm to maintain the vertical height of the fork carriage substantially the same throughout the clockwise movement of the arm.

21. The lift device as in claim 13 wherein counterclockwise pivotal movement of the arm causes the second connecting member to move relative to the second drive member which causes the second driven member and cam to co-rotate counterclockwise which in turn causes the third connecting member to move in proportion to the vertical displacement of the arm to maintain the vertical height of the fork carriage substantially the same throughout the counterclockwise movement of the arm.

22. A lift device, comprising:

a mast;

an arm pivotally carried by the mast;

an actuator connected to the arm and operable to pivot the arm relative to the mast;

a first drive member fixed to the mast;

a bracket pivotally carried adjacent to one end of the arm;

a fork carriage carried by the bracket for linear movement relative to the arm;

a first driven member fixed to the fork carriage;

a first connecting member interconnecting the first drive member and the first driven member such that pivotal movement of the arm causes the first driven member, the bracket, and the fork carriage to co-rotate relative to the arm;

a second drive member fixed relative to the mast;

a second driven member pivotally carried by the arm;

a cam pivotally carried by the arm;

a second connecting member interconnecting the second drive member and the second driven member such that pivotal movement of the arm causes the driven member and the cam to co-rotate relative to the arm;

a third connecting member interconnecting the cam and the fork carriage such that rotation of the cam relative to the arm causes the fork carriage to extend away from or retract towards the arm.

23. The lift device as in claim 22 wherein the fork carriage has at least one tine such that said at least one tine maintains substantially the same attitude and vertical height throughout the movement of the arm.

24. The lift device as in claim 22 wherein the first drive member is a first sprocket and the first driven member is a second sprocket, the first and second sprockets having the same pitch diameter, and the first connecting member is a chain trained around the first and second sprockets.

25. The lift device as in claim 22 wherein the cam has a contour corresponding to the angle spanned by the arm during pivotal movement.

26. The lift device as in claim 22 further comprising a first pivot shaft carried by the mast with the first drive member and the second drive member rotatably carried by the first pivot shaft.

27. The lift device as in claim 26 further comprising a second pivot shaft and an idler wheel wherein the second pivot shaft is fixed to the arm and wherein the first driven member, the roller bracket assembly, and the idler wheel are rotatably carried on the second pivot shaft.

28. The lift device as in claim 27 wherein the third connecting member is connected at one end to the cam and at its other end to the fork carriage with a portion of the third connecting member received by the idler wheel to ensure that the third connecting member acts on the fork carriage in a linear fashion.

29. The lift device as in claim 22 wherein the fork carriage has an I-beam support with channels and the bracket has spaced roller posts slidably received in the channels of the I-beam support.

30. The lift device as in claim 22 further comprising a third pivot shaft carried by the arm with the second driven member and the cam rotatably carried by the third pivot shaft.

31. The lift device as in claim 22 wherein counterclockwise pivotal movement of the arm causes the first connecting member to move relative to the first drive member which causes the first driven member and fork carriage to rotate counterclockwise to ensure the fork carriage maintains the same attitude throughout the counterclockwise movement of the arm.

32. The lift device as in claim 22 wherein counterclockwise pivotal movement of the arm causes the second connecting member to move relative to the second drive member which causes the second driven member and cam to co-rotate clockwise which in turn causes the third connecting member to move in proportion to the vertical displacement of the arm to maintain the vertical height of the fork carriage substantially the same throughout the counterclockwise movement of the arm.

33. The lift device as in claim 22 wherein clockwise pivotal movement of the arm causes the second connecting member to move relative to the second drive member causing the second driven member and cam to co-rotate counterclockwise which in turn causes the third connecting member move relative to the cam in proportion to the vertical displacement of the arm to maintain the vertical height of the fork carriage substantially the same throughout the clockwise movement of the arm.

* * * * *